Patented Nov. 11, 1924.

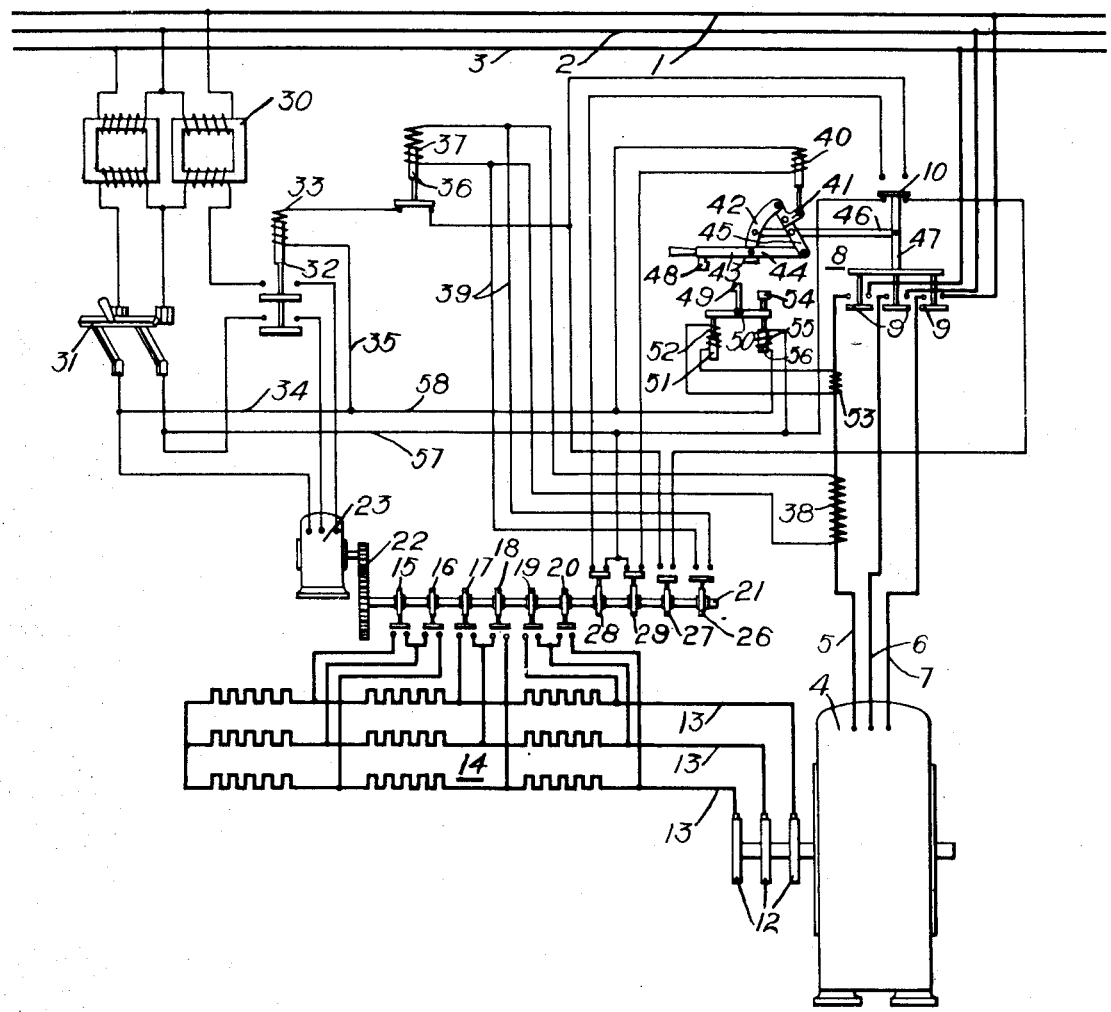

1,515,205

UNITED STATES PATENT OFFICE.

GEORGE W. HUEY, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed October 17, 1918. Serial No. 258,529.

*To all whom it may concern:*

Be it known that I, GEORGE W. HUEY, a citizen of the United States, and a resident of Wilkinsburg, in the county of Allegheny and State of Pennsylvania, have invented a new and useful Improvement in Motor-Control Systems, of which the following is a specification.

My invention relates to motor-control systems, particularly to systems involving the use of pilot motors for controlling the operation of industrial motors.

An object of my invention is to provide such a system in which the pilot motor shall be of the non-reversing type.

A further object of my invention is to provide a control system of the character designated in which the closing of the primary circuits of the main motor is prevented until the pilot motor occupies a predetermined position.

Still another object of my invention is to provide a system in which the operation of the pilot motor is controlled, in accordance with the electrical conditions of the main motor, by a relay the actuating coil of which may be short-circuited.

My invention comprises also a novel line switch and circuit breaker.

According to my invention, upon the closing of the main motor circuits, a pilot motor operates from an initial position to rotate the drum shaft of a cam controller through a fraction of a rotation to cause the short-circuiting of the main motor resistors. The main motor is thus brought up to speed, whereupon the pilot motor is automatically stopped. I provide means for automatically stopping the pilot motor during the short-circuiting operation, under predetermined conditions, to prevent too rapid acceleration of the main motor. Upon the main motor being disconnected from the line, either mechanically or because of voltage failure, the pilot motor is again set into operation to rotate the drum shaft of the cam controller further in the same direction of rotation to its initial position, thus preparing for the next cycle of operations. The pilot motor and the main motor are preferably connected to the same source of alternating current. I provide a novel line switch and circuit breaker which is automatically locked open to prevent the closing of the circuits of the main motor until after the closing of the circuits of the pilot motor. The circuits for releasing the lock, as well as those for starting the pilot motor from, and returning it to its initial position, are controlled by switches which are operated by cams on the drum shaft of the cam controller.

My invention will be described in connection with the accompanying drawing, in which the single figure is a diagrammatic view of circuits and apparatus embodying my invention.

Line conductors 1, 2 and 3, which may be connected to any suitable source of alternating current, supply energy to an induction motor 4. The primary windings of the motor 4 are connected to the line conductors 1, 2 and 3 by conductors 5, 6 and 7, respectively, through a line switch and circuit breaker 8, controlling contact members 9 having a switch 10 mechanically interlocked therewith. The secondary windings of the main motor 4 are connected, through slip rings 12 and conductors 13, to resistors 14. The resistors 14 are adapted to be short-circuited by a plurality of switches, each operated by one of a plurality of cams 15, 16, 17, 18, 19 and 20, mounted upon a shaft 21, adapted to be rotated, through gearing 22, by a pilot motor 23. A plurality of additional cams 26, 27, 28 and 29, for a purpose hereinafter specified, are also mounted upon, and are rotatable with, the shaft 21. The motor 23 is supplied with energy from the line conductors 1, 2 and 3 through a suitable transformer 30 and circuits comprising a knife-blade switch 31 and an electromagnetic switch 32, actuated by a coil 33. The coil 33 is connected in circuits including the line switch 31, the conductors 34 and 35 and an overload relay 36, as well as the switches controlled by the cams 27 and 28, as described below. The actuating coil 37 of the accelerating relay 36 is connected in a circuit including a transformer 38, which is suitably connected to the line conductor 5. The coil 37 is adapted to be short-circuited, in the running position of the motor 4, by means of a circuit including the conductors 39 and the switch operated by the cam 26. An actuating coil 40 controls a locking member 41 which is pivoted to an arm 42 which, in turn, is pivoted to the main lever 43 of the line switch or circuit breaker 8.

The lever 43 is pivoted at 44. A link 45 connects the lever 43 to a lever 46, pivoted to the arm 42. The lever 46 is pivoted to a lever 47 which carries the contact members 9 and 10. A hook member 48, secured to the lever 43, is adapted to engage a smaller hook member 49, pivoted at 50 and provided with a core 51, adapted to be energized by an actuating coil 52, which is connected in a circuit including a series transformer 53 suitably connected to the conductor 5. A weight 54 is secured to a core 55 having an energizing coil 56. The core 55 is slidably connected to the hook 49 in such fashion that, when the coil 56 is de-energized by failure of voltage, the weight 54 falls and drives hook member 49 away from hook member 48, which releases the switch members 9. The core 55 is normally maintained in raised position by the coil 56 which is connected to the switch 31 by a circuit leading from the conductor 34 to a conductor 57. The hook member 48 is also released, under overload conditions, by the raising of the core 51 caused by excess currents in the coil 52, which is connected to the series transformer 53. The circuit of the actuating coil 40 comprises the switch controlled by the cam 29.

The several parts of the system are illustrated as occupying the positions assumed by them when the main motor 4 is not operating. To start the main motor 4, the switch 31 is closed by the operator. A single-phase current then flows from one terminal of the transformer 30, through the switch 31, the conductor 34, the conductor 58, the actuating coil 40, the switch controlled by the cam 29, the conductor 57 and the switch 31 to another terminal of the transformer 30. The actuating coil 40 being thus energized, the locking member 41 is raised to permit the actuation of the line switch and circuit breaker 8 to cause engagement of the hook members 48 and 49 and the closing of the switches 9. The closing of the switches 9 completes the circuits of the main motor 4. Simultaneously with the closing of the switches 9, the upper contact members of the switch 10 are closed and the lower contact members opened. The closing of the upper contact members establishes a circuit extending from one terminal of the transformer 30 through the switch 31, the conductor 34, the conductor 35, the actuating coil 33, the relay 36, the upper contact members of the switch 10, the switch controlled by the cam 28, the conductor 57 and the switch 31 to another terminal of the transformer 30. The establishment of this circuit causes the energization of the coil 33 and the consequent closing of the switch 32. The pilot motor 23, being thus connected to the line, starts to operate to cause the successive closing of the switches 15 to 20 to cause the successive short-circuiting of the various portions of the resistor 14 of the main motor 4. If, at any time during this short-circuiting operation, the current of the main motor 4 exceeds a predetermined value, the coil 37 will be energized, through the transformer 38, to open the circuit of the coil 33, above traced, and thereby cause the stopping of the pilot motor 23. The relay 36 will remain raised until the current in the motor 4 falls to a safe value, whereupon the coil 33, becoming again energized, will again cause the closing of the circuits of the pilot motor 23, and the short-circuiting operation of the resistor 14 will proceed as before.

The cams 15 to 20 and 26 to 28 are so designed that the switches controlled by the cams 15 to 20 will be successively closed, the switches 28 and 29 remaining closed, until all the resistor has been short-circuited, whereupon the switches controlled by the cams 28 and 29 will be opened and the switches controlled by the cams 26 and 27 will thereupon be closed. The cam 26 closes a switch to cause the short-circuiting of the coil 37 so as to avoid the necessity of maintaining the coil 37 energized while the motor 4 is running. The opening of the switch controlled by the cam 28 de-energizes the coil 33 so that the pilot motor 23 is stopped. The closing of the switch controlled by the cam 27 establishes a circuit extending from one terminal of the transformer 30 through the switch 31, the conductor 34, the conductor 35, the coil 33, the relay 36, the switch controlled by the cam 27, the switch 10, when it occupies its lower position, the conductor 57 and the switch 31 to another terminal of the transformer. This circuit cannot be closed until the switch 10 assumes its lower position, which will take place either manually, by moving the lever 43 so as to disengage the hook 48 from the hook 49, or automatically, first, under no-voltage conditions, upon the failure of voltage, which will cause the de-energization of the coil 56 and the consequent dropping of the weight 54 and secondly, under overload conditions, when the core 51 is raised by the coil 52 to disengage the hook members 48 and 49. The closing of the lower contact members by the switch 10, and the consequent energization of the above-traced circuit, controlled thereby, start the motor 23 to operating in the same direction as before to cause the shaft 21 to assume its initial position in preparation for the next cycle of operations. My system thus insures that the motor 4 shall be started with the resistors 14 in circuit, these resistors being then gradually short-circuited in accoradnce with the speed of the motor.

It will be understood that the specific embodiment of my invention herein illustrated and described is one form only of my invention and that I do not desire to be limited except in so far as limitations may be imposed by the appended claims.

I claim as my invention:

1. The combination with an electric motor having a resistor in circuit therewith, and a source of current for said motor, of a switch for connecting said motor to said source, a pilot motor for short-circuiting said resistor, means for causing said pilot motor to assume its initial position upon the opening of said switch, and mechanical means for positively preventing the closing of said switch except when the motor is in position to insert said resistor in the motor circuit.

2. The combination with a motor and a resistor therefor, of a switch for closing the circuit of said motor, a pilot motor for controlling said resistor, mechanical means for preventing the closing of said switch except when said pilot motor is in position to insert said resistor in the circuit of said motor, and electromagnetic means for rendering said mechanical means ineffective.

In testimony whereof, I have hereunto subscribed my name this 3rd day of Oct. 1918.

GEORGE W. HUEY.